May 16, 1933. T. N. GARSON 1,909,528
TRACTOR CRANE
Filed April 29, 1931 2 Sheets-Sheet 1

INVENTOR
Thorvald N. Garson
BY
H. Lee Helms
ATTORNEY

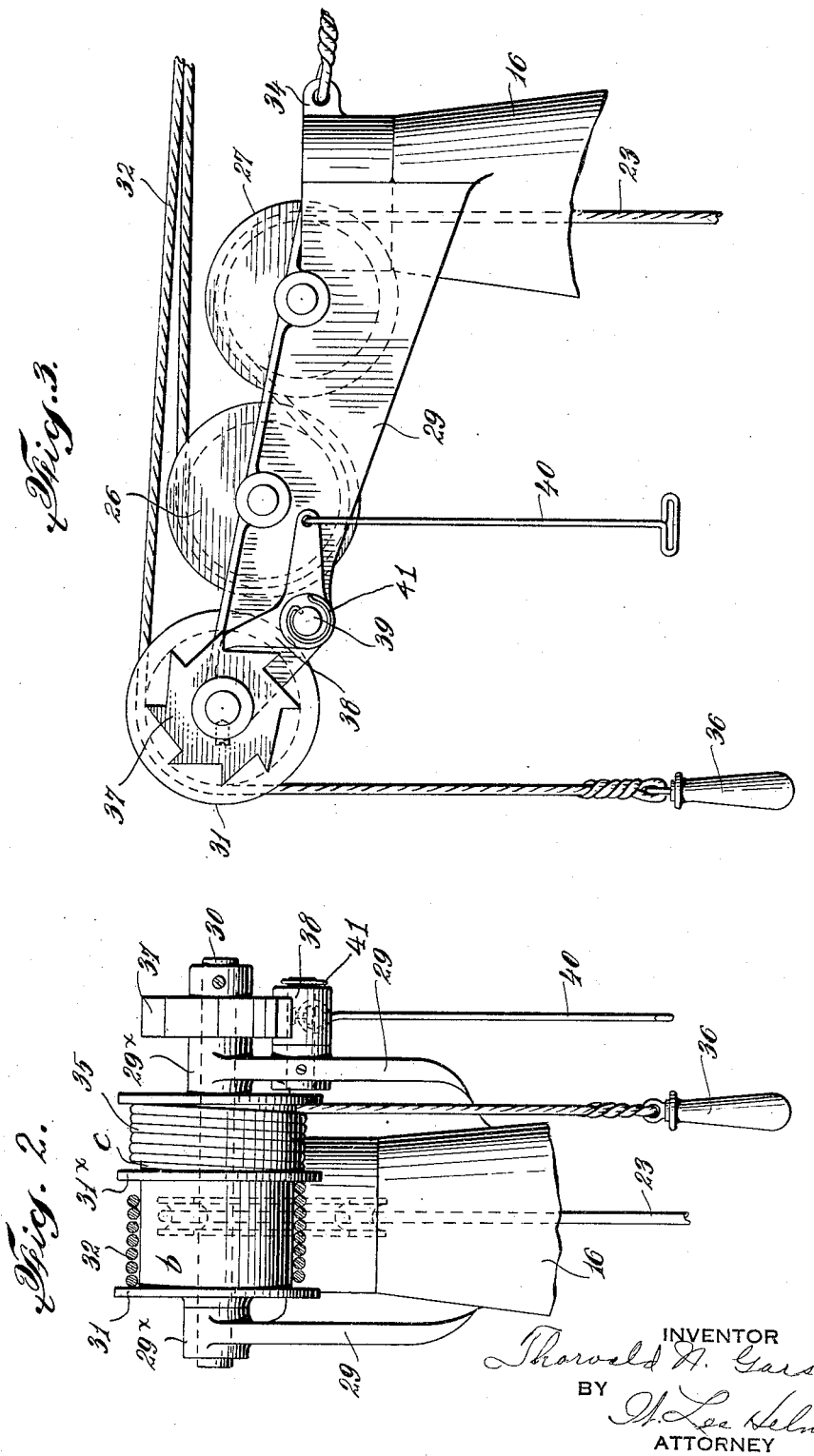

Patented May 16, 1933

1,909,528

UNITED STATES PATENT OFFICE

THORVALD N. GARSON, OF NEW BRIGHTON, STATEN ISLAND, NEW YORK

TRACTOR CRANE

Application filed April 29, 1931. Serial No. 533,688.

The object of the present invention is to provide a tractor crane of the type incorporating a rotatable turret supported boom hoisting line sheaves and rotatable boom controlling element also carried by the turret, the relation of these elements to the turret and the relation of the turret to the tractor crane being such that the capacity of the tractor crane to elevate and handle heavy loads is increased to the extent that loads which in the usual direction and mounting of the elements would upset the tractor crane or require the application of stabilizing elements thereto, are, under the present invention, handled with ease.

The invention will be described with reference to the accompanying drawings in which Fig. 1 is a side elevation of an embodiment of the invention.

Fig. 2 is a fragmentary enlarged view taken from the rear of the device and illustrating the upper portion of the turret and the boom holding elements, the boom holding line being shown in section.

Fig. 3 is an enlarged view in side elevation of the upper portion of the turret showing the boom holding mechanism and the hoisting line sheaves.

Figure 1:
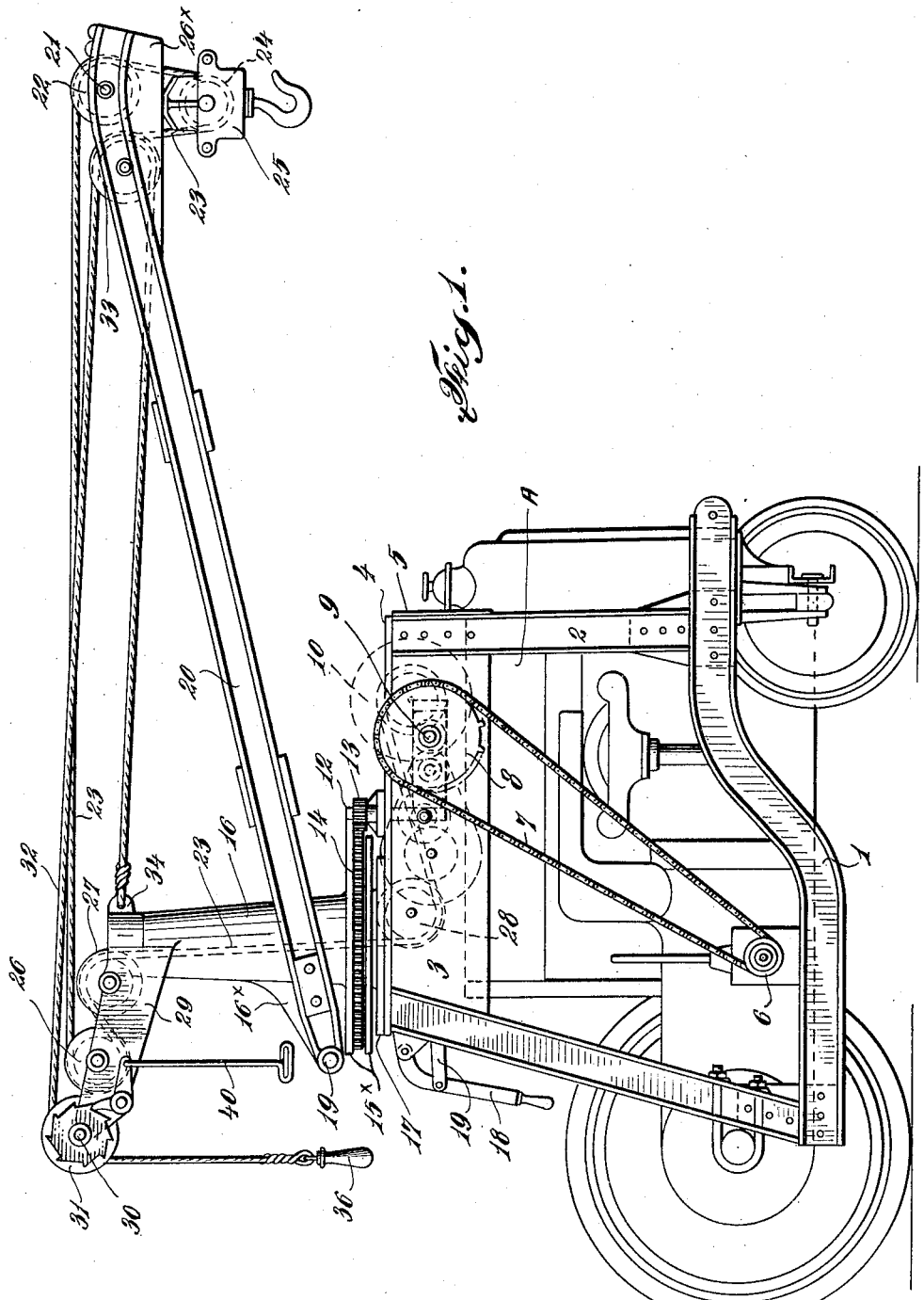

In the drawings, I have shown in Fig. 1, a tractor indicated generally at A, the tractor having at each side thereof, longitudinal frame members 1 supporting upwardly extending risers 2, each of which supports a longitudinal upper frame member 3. Frame members 3 and risers 2 will be suitably connected as by top plate 4, front plate 5 and other inter-connecting members not shown.

Between the longitudinal top plates 3, one of which is shown, will be mounted driving elements for raising and lowering the hoist line and for rotating the turret. In the present instance, power is taken from the sprocket 6 and conveyed by chain 7 to sprocket wheel 8 on shaft 9. Shaft 9 will be geared to drum 10 shown in dotted lines, Fig. 1, drum 10 having wound thereon hoist rope 23.

Shaft 9 will also be connected by gearing to shaft 12 having thereon a pinion 13 meshing with gear wheel 14 carried by the lower flange bases 15x of a turret 16 rotatably supported above tractor crane as by a mast, the base of the latter being indicated at 17, Fig. 1. It will be understood that means will be provided for throwing hoisting drum 10 and also turret revolving means into and out of action, such means forming no part of the present invention, and not being illustrated, the drawings showing, however, a conventional form of controlling lever 18 and a link 19 which may lead to certain clutch mechanism, as, for example, a clutch, which will connect the gear of hoist drum 10 to shaft 9 and additional controlling levers may be provided for connecting and disconnecting such elements as the turret revolving mechanism.

Projecting rearwardly of the turret near its base for a substantial distance, is the bracket arm 16x to which is pivoted at 19 the boom 20. At its lower outer end the boom is provided with a depending contract face 26x above which is mounted by shaft 21 a pulley 22. Secured to the outer end of the boom is hoist rope 23 led over sheave 24 of sheave block 25 and thence over pulley 22, the hoist rope extends rearwardly of the turret 16 and is led over a pulley 26 passing therefrom to a pulley 27 and thence downwardly through the turret. Below the turret the hoist rope passes over a pulley 28 and thence to drum 10.

Pulleys 26 and 27 are mounted on opposed rearwardly extending bracket arms 29 carried by the turret 16 and which arms may be cast integrally with the turret or applied thereto by bolts or welding. Each arm at its outer end is provided with a bearing boss 29x and these bosses receive a shaft 30. Mounted on the shaft intermediate the arms is a drum 31 divided into two rope receiving surfaces by an intermediate annular flange 31x.

Referring to Fig. 2, it will be seen that wound on section b of drum 31 is a boom holding rope 32 the rope thence extending over pulley 33 near the end of the boom and carried by the latter and thence being led back to the turret and connected thereto at 34. Drum section c has wound about the same a cable 35 having a depending end to which is attached a pull handle 36. Shaft 30 is keyed to the drum and also keyed thereto is a ratchet wheel 37 adapted to be engaged by a pawl 38 on shaft 39 the pawl having connected thereto a release wire 40. It will be understood that the ends of cable 32 and cable 35 at the surface of the drum may be secured thereto, if desired. Spring 41 tends to keep pawl 38 in engagement with ratchet wheel 37.

It will be seen by the arrangement above described, the boom is pivoted at a point substantially back of the axis of turret 16 the hoist rope 23 is led over sheave 26 in the vertical line with the boom pivot thereby throwing the load reactions back of the vertical axis of the turret so that the tractor crane will have a greater handling capacity, when acting upon a load over the side of the tractor than in constructions hereto proposed. In addition, manual control means are provided for taking up the slack in the boom holding rope, said means consisting of the drum section c in connection with the cable 35 and latching means comprising ratchet 37 and pawl 38. As the boom is raised by the winding in of rope 23 and the action of pulley block 25 against contact surface 26x, slack will be provided in the boom holding rope at 23 and thereupon a downward pull upon handle 36 will cause rotation of drum 31 to take up the slack, the drum being automatically latched by the ratchet and pawl. This slack can be taken up immediately prior to paying out hoist rope 23 in causing the load to descend.

Having described my invention, what I claim and desire to secure by Letters Patent is as follows:—

1. In apparatus of the character described, a tractor, a drum and power means for rotating said drum, a standard rising vertically from the tractor, a turret rotatable about the standard and provided with a laterally extending bracket, a boom extending transversely of the turret and pivoted to said bracket at a point substantially to the rear of the longitudinal axis of the turret, the pivotal point of the boom being substantially rearwardly of the longitudinal center of the tractor, a hoist rope operatively connected to said drum, a boom holding rope, means for taking up slack in said rope as the hoist rope is wound in and the boom is raised, and means for latching the boom holding rope to permit reversal in operation of the hoist rope without affecting the elevated position of the boom.

2. In apparatus of the character described a tractor, a hoist drum and operating means therefor, a standard rising vertically from the tractor, a boom extending across the longitudinal axis of the standard, means for pivoting the boom at a point substantially laterally of the longitudinal axis of the standard, a hoist rope led over the boom, a drum and power means for rotating the same, the drum being connected to the hoist rope, and a guide pulley for the hoist rope adapted to receive the latter intermediate the drum and the front end of the boom, said guide pulley being disposed laterally of the standard and approximately in a vertical line intersecting the pivotal point of the boom.

3. In apparatus of the character described, a tractor, a drum and power means for rotating said drum, a standard rising vertically from the tractor, a turret rotatable about the standard, superposed upper and lower brackets projecting laterally from the turret, a boom extending transversely of the turret and pivoted to the lower bracket at a point substantially to one side of the longitudinal axis, a hoist rope carried by the boom, a pulley carried by the upper bracket and receiving the hoist rope, and a guide pulley in advance of the first named pulley to which the hoist rope is led and thence through the standard and to the drum.

4. In apparatus of the character described, a tractor, a drum, and power means for rotating said drum, a standard rising vertically from the tractor, a turret rotatable about the standard, upper and lower brackets projecting laterally from the turret, a boom extending transversely from the turret and pivoted to the lower bracket at a point substantially to one side of the longitudinal axis, a hoist rope carried by the boom, a pulley carried by the upper bracket at a point substantially to one side of the longitudinal axis of the turret, and receiving the hoist rope, a guide pulley for the hoist rope supported by the turret with the periphery adjacent the longitudinal axis of the turret, a boom holding rope, latching means for the boom holding rope comprising a drum disposed rearwardly of the hoist rope receiving pulley and releasable holding means therefor.

In testimony whereof, I have signed my name to this specification:

THORVALD N. GARSON.